United States Patent
Rose

(10) Patent No.: US 10,142,099 B2
(45) Date of Patent: Nov. 27, 2018

(54) METHOD AND APPARATUS FOR A COMPUTABLE, LARGE, VARIABLE AND SECURE SUBSTITUTION BOX

(71) Applicant: QUALCOMM Incorporated, San Diego, CA (US)

(72) Inventor: Gregory Gordon Rose, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 409 days.

(21) Appl. No.: 13/935,962

(22) Filed: Jul. 5, 2013

(65) Prior Publication Data

US 2014/0198913 A1    Jul. 17, 2014

Related U.S. Application Data

(60) Provisional application No. 61/751,541, filed on Jan. 11, 2013.

(51) Int. Cl.
*H04L 9/00* (2006.01)
*H04L 9/08* (2006.01)
*H04L 9/06* (2006.01)

(52) U.S. Cl.
CPC .......... *H04L 9/0816* (2013.01); *H04L 9/0631* (2013.01); *H04L 9/0618* (2013.01)

(58) Field of Classification Search
CPC ..... H04L 9/0625; H04L 9/002; H04L 9/0631; H04L 9/0618; H04L 2209/24;

(Continued)

(56) References Cited

U.S. PATENT DOCUMENTS

| 4,275,265 A * | 6/1981 | Davida ................ H04L 9/0618 380/29 |
| 4,382,300 A | 5/1983 | Gupta |

(Continued)

FOREIGN PATENT DOCUMENTS

| CN | 1488091 A | 4/2004 |
| CN | 101086769 A | 12/2007 |

(Continued)

OTHER PUBLICATIONS

Zeng, et al., "Improvement on Masked S-box Hardware Implementation", 2012, International Conference on Innovations in Information Technology (IT).*

(Continued)

*Primary Examiner* — Daniel B Potratz
(74) *Attorney, Agent, or Firm* — Jae-Hee Choi; Loza & Loza

(57) ABSTRACT

One feature pertains to methods for generating cryptographic values associated with substitution boxes (S-box). The methods includes first obtaining an input value and a first value. One method includes generating an S-box output value by performing an exclusive OR (XOR) operation on the input value and the first value to generate an intermediate value, and performing a bitwise rotation on the intermediate value by a number of bits equal to the Hamming Weight of the intermediate value. In one aspect, the output of this bitwise rotation is further XOR-ed with a second value. Another method includes generating the S-box output value by performing a bitwise rotation on the input value by a number of bits equal to the Hamming Weight of the input value to generate an intermediate value, and performing an XOR operation on the intermediate value and the first value.

28 Claims, 10 Drawing Sheets

(58) Field of Classification Search
CPC ...... H04L 2209/00–2209/043; H04L 2209/12; H04L 2209/122
See application file for complete search history.

(56) References Cited

U.S. PATENT DOCUMENTS

| | | | |
|---|---|---|---|
| 6,182,216 B1 * | 1/2001 | Luyster | 713/168 |
| 6,185,679 B1 | 2/2001 | Coppersmith et al. | |
| 8,155,317 B2 | 4/2012 | Motoyama | |
| 9,083,507 B2 * | 7/2015 | Shibutani | H04L 9/0625 |
| 2002/0154767 A1 * | 10/2002 | Endo et al. | 380/28 |
| 2005/0055596 A1 | 3/2005 | Abe et al. | |
| 2006/0002548 A1 | 1/2006 | Chu | |
| 2008/0019503 A1 | 1/2008 | Dupaquis et al. | |
| 2010/0329450 A1 | 12/2010 | Rarick et al. | |
| 2011/0013769 A1 * | 1/2011 | Itoh et al. | 380/28 |
| 2012/0250854 A1 | 10/2012 | Danger et al. | |

FOREIGN PATENT DOCUMENTS

| | | |
|---|---|---|
| CN | 101520965 A | 9/2009 |
| CN | 101729241 A | 6/2010 |
| CN | 101826959 A | 9/2010 |
| CN | 101841415 A | 9/2010 |
| CN | 101848078 A | 9/2010 |
| EP | 2048641 A1 | 4/2009 |
| JP | H01252989 A | 10/1989 |
| JP | H01302289 A | 12/1989 |
| JP | H03254538 A | 11/1991 |
| JP | 2002518713 A | 6/2002 |
| JP | H01179987 A | 6/2002 |
| WO | WO-9908411 A2 | 2/1999 |
| WO | WO-2008026624 A1 | 3/2008 |
| WO | WO 2012/132622 * | 10/2012 |

OTHER PUBLICATIONS

Avoine, G., et al., "Yet Another Ultralightweight Authentication Protocol that is broken", Jul. 2, 2012 (Jul. 2, 2012), Radio Frequency Identification. Security and Privacy Issues, Springer Berlin Heidelberg, Berlin, Heidelberg, pp. 20-30, XP047021987, ISBN: 978-3-642-36139-5, abstract p. 21, line 14-line 21, p. 29, line 9-line 19.
International Search Report and Written Opinion—PCT/US2013/077939—ISA/EPO—dated Mar. 27, 2014.
Nguyen, P.H., et al., "On Related-Key Attacks and KASUMI:The Case of A5/3", Dec. 11, 2011 (Dec. 11, 2011), Progress in Cryptology Indocrypt 2011, Springer Berlin Heidelberg, Berlin, Heidelberg, pp. 146-159, XP019170587, ISBN: 978-3-642-25577-9, abstract figure 5, pp. 152, line-line 21.
Zhongping Q et al., "Optimization of S-Boxes by Evolving", Intelligent Systems and Applications (ISA), 2010 2nd International Workshop on, May 22-23, 2010, pp. 1-4.
Taiwan Search Report—TW103100515—TIPO—dated Aug. 11, 2015.

* cited by examiner

Input x (e.g., 110101)

Rotate_HW(x)  102   100

Output z (e.g., 011101)

| Output z bit | Value | HWBF |
|---|---|---|
| LSB | 1 | $W(x)$ |
| 2nd LSB | 0 | $W(x<<1)$ |
| 3rd LSB | 1 | $W(x<<2)$ |
| 4th LSB | 1 | $W(x<<3)$ |
| 5th LSB | 1 | $W(x<<4)$ |
| 6th LSB | 0 | $W(x<<5)$ |

200

METHOD AND APPARATUS FOR A COMPUTABLE, LARGE, VARIABLE AND SECURE SUBSTITUTION BOX

CLAIM OF PRIORITY

The present application for patent claims priority to provisional application No. 61/751,541 entitled "Method and Apparatus for Computable, Large, Variable, and Secure Substitution Box" filed, Jan. 11, 2013 the entire disclosure of which is hereby expressly incorporated by reference.

BACKGROUND

Field

Various features relate to cryptography, and more particularly to methods and apparatuses for implementing Substitution-boxes.

Background

In cryptography, a Substitution-box (S-box) is a basic component of symmetric key algorithms that perform substitution. In block ciphers, they are typically used to obscure the relationship between a key and cipher-text, and thus demonstrate Shannon's property of confusion. The S-box represents a complex function that receives n input bits and generates m output bits, such that the output has certain cryptographically useful properties. These properties include high non-linearity and balance, high algebraic degree, strict avalanche criterion satisfaction, and other properties. Such functions are hard to compute and are often represented as lookup tables, such as in the Data Encryption Standard (DES) and Advanced Encryption Standard (AES). For example, in AES an 8-bit input is replaced by the 8-bit value selected from an S-box. In some cases, n may equal m so that the input and output to the S-box have the same bit lengths.

If n is large, the lookup tables described above (or equivalently a network of gates for a hardware implementation) can quickly become unwieldy. On the other hand, a small n is by definition limited in nonlinearity and algebraic degree. Therefore, an S-box having a large number of input bits that is also able to be efficiently implemented in hardware or software is desirable.

A Hidden Weighted Bit Function (HWBF) may be viewed as an n-bit to 1-bit S-box that enjoys some of the desirable cryptographic properties described above, such as balance and algebraic complexity. For example, if x is an n-bit input, with $x_i$ being the i-th ($1 \leq i \leq n$) most significant bit of x, then the output W of the HWBF is defined as:

$W(x)=0$ if $x=0$, $W(x)=x_k$ where k is the Hamming Weight of x, otherwise.

FIG. 1 illustrates a schematic block diagram of an n-bit to n-bit HWBF based S-box 100 found in the prior art that may be easily implemented in hardware. A binary input value x (e.g., 110101) is input into a rotate function 102. The rotate function 102 performs a bitwise rotation left on the input x by a number of bits equal to the Hamming Weight of the input. Thus, if the binary input x equals 110101, the output z of the rotate function 102 is equal to 011101 since the Hamming Weight is equal to four (4).

FIG. 2 illustrates a table 200 depicting the relationship between the HWBF based S-box output z and the HWBF W(x). Referring to FIGS. 1 and 2, it may be shown that the least significant bit of the output z (e.g., 1) is equal to the HWBF W(x) (defined above) of the input value x. It may also be observed that the second least significant bit (e.g., 0) represents the output of the HWBF W(x) if the input value x to the HWBF had undergone a single bit bitwise rotation right (denoted by W(x<<1)). The third least significant bit represents the output of the HWBF W(x) if the input value x to the HWBF had undergone a two bit bitwise rotation right (denoted by W(x<<2)), and so on.

Thus, the output value z has the same number of bits as the input value x where each bit represents a different HWBF W(x) output computed in parallel. The bits of the output value z still retain some of the beneficial cryptographic properties described above with respect to HWBFs. Unfortunately, the S-box 100 also has undesirable properties. For example, one such undesirable property is that the output z will have the same Hamming weight as the input x, which can often simplify cryptanalysis, particularly when the input x is of low Hamming Weight. It would be desirable to increase the security of the S-box 100 to make it more resistant to cryptographic attacks (cryptanalysis).

Thus, there is a need for improved S-box algorithms, methods, and apparatuses that are more robust against cryptographic attacks.

SUMMARY

One feature provides a method for generating cryptographic values associated with a substitution box (S-box). The method comprises obtaining an input value and a first value, and generating an S-box output value by one of: (A) performing a bitwise exclusive OR (XOR) operation on the input value and the first value to generate a first intermediate value, and performing a bitwise rotation operation on the first intermediate value by a number of bits equal to the Hamming Weight of the first intermediate value to generate the S-box output value; (B) performing a bitwise rotation operation on the input value by a number of bits equal to the Hamming Weight of the input value to generate the first intermediate value, and performing a bitwise XOR operation on the first intermediate value and the first value to generate the S-box output value; or (C) performing a bitwise XOR operation on the input value and the first value to generate the first intermediate value, performing a bitwise rotation operation on the first intermediate value by a number of bits equal to the Hamming Weight of the first intermediate value to generate a second intermediate value, obtaining a second value, and performing a bitwise XOR operation on the second intermediate value and the second value to generate the S-box output value. According to one aspect, at least one of the first and/or second values provided are configured to generate the S-box output value having a different Hamming Weight than the input value with a probability equal to or greater than 50%. According to another aspect, at least one of the first value and/or the second value is a constant having a non-zero Hamming Weight.

According to one aspect, at least one of the first and/or second values provided are variable and have a probability equal to or greater than $100*(1-2^{-n})$ percent of having a non-zero Hamming Weight, where n is a number of bits of the first and/or second values. According to another aspect, at least one of the first value and/or the second value is derived from at least one of a cryptographic function and/or cryptographic key. According to yet another aspect, at least one of the first value and/or the second value is derived from a component stage of a cipher module.

According to one aspect, the cipher module is a stream cipher. According to another aspect, the method is executed in a memory circuit. According to yet another aspect, the input value and the S-box output value have the same number of bits.

According to one aspect, the method further comprises obtaining a main input value, apportioning bits of the main input value to obtain a plurality of non-linear transformation function (NLTF) input values, wherein each NLTF input value has a number of bits that is less than a number of bits of the main input value, providing each of the NLTF input values to an NLTF that executes a non-linear operation to generate a plurality of NLTF output values that each correspond to the NLTF input value provided to the NLTF, and concatenating the plurality of NLTF output values to obtain the input value. According to another aspect, the main input value is apportioned so that each of the plurality of NLTF input values have the same number of bits.

Another feature provides an electronic device comprising a processing circuit configured to obtain an input value and a first value, and generate an S-box output value by one of: (A) performing a bitwise exclusive OR (XOR) operation on the input value and the first value to generate a first intermediate value, and performing a bitwise rotation operation on the first intermediate value by a number of bits equal to the Hamming Weight of the first intermediate value to generate the S-box output value; (B) performing a bitwise rotation operation on the input value by a number of bits equal to the Hamming Weight of the input value to generate the first intermediate value, and performing a bitwise XOR operation on the first intermediate value and the first value to generate the S-box output value; or (C) performing a bitwise XOR operation on the input value and the first value to generate the first intermediate value, performing a bitwise rotation operation on the first intermediate value by a number of bits equal to the Hamming Weight of the first intermediate value to generate a second intermediate value, obtaining a second value, and performing a bitwise XOR operation on the second intermediate value and the second value to generate the S-box output value.

According to one aspect, the processing circuit is further configured to obtain a main input value, apportion bits of the main input value to obtain a plurality of non-linear transformation function (NLTF) input values, wherein each NLTF input value has a number of bits that is less than a number of bits of the main input value, provide each of the NLTF input values to an NLTF that executes a non-linear operation to generate a plurality of NLTF output values that each correspond to the NLTF input value provided to the NLTF, and concatenate the plurality of NLTF output values to obtain the input value.

Another feature provides an electronic device comprising means for obtaining an input value and a first value, and means for generating an S-box output value by one of: (A) means for performing a bitwise exclusive OR (XOR) operation on the input value and the first value to generate a first intermediate value, and means for performing a bitwise rotation operation on the first intermediate value by a number of bits equal to the Hamming Weight of the first intermediate value to generate the S-box output value; (B) means for performing a bitwise rotation operation on the input value by a number of bits equal to the Hamming Weight of the input value to generate the first intermediate value, and means for performing a bitwise XOR operation on the first intermediate value and the first value to generate the S-box output value; or (C) means for performing a bitwise XOR operation on the input value and the first value to generate the first intermediate value, means for performing a bitwise rotation operation on the first intermediate value by a number of bits equal to the Hamming Weight of the first intermediate value to generate a second intermediate value, means for obtaining a second value, and means for performing a bitwise XOR operation on the second intermediate value and the second value to generate the S-box output value.

According to one aspect, the electronic device further comprises means for obtaining a main input value, means for apportioning bits of the main input value to obtain a plurality of non-linear transformation function (NLTF) input values, wherein each NLTF input value has a number of bits that is less than a number of bits of the main input value, means for providing each of the NLTF input values to an NLTF that executes a non-linear operation to generate a plurality of NLTF output values that each correspond to the NLTF input value provided to the NLTF, and means for concatenating the plurality of NLTF output values to obtain the input value.

Another feature provides a computer-readable storage medium having instructions for generating cryptographic values associated with a substitution box (S-box) stored thereon, the instruction which when executed by at least one processor causes the processor to obtain an input value and a first value, and generate an S-box output value by one of: (A) performing a bitwise exclusive OR (XOR) operation on the input value and the first value to generate a first intermediate value, and performing a bitwise rotation operation on the first intermediate value by a number of bits equal to the Hamming Weight of the first intermediate value to generate the S-box output value; (B) performing a bitwise rotation operation on the input value by a number of bits equal to the Hamming Weight of the input value to generate the first intermediate value, and performing a bitwise XOR operation on the first intermediate value and the first value to generate the S-box output value; or (C) performing a bitwise XOR operation on the input value and the first value to generate the first intermediate value, performing a bitwise rotation operation on the first intermediate value by a number of bits equal to the Hamming Weight of the first intermediate value to generate a second intermediate value, obtaining a second value, and performing a bitwise XOR operation on the second intermediate value and the second value to generate the S-box output value.

According to one aspect, the instructions which when executed by the processor further cause the processor to obtain a main input value, apportion bits of the main input value to obtain a plurality of non-linear transformation function (NLTF) input values, wherein each NLTF input value has a number of bits that is less than a number of bits of the main input value, provide each of the NLTF input values to an NLTF that executes a non-linear operation to generate a plurality of NLTF output values that each correspond to the NLTF input value provided to the NLTF, and concatenate the plurality of NLTF output values to obtain the input value.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation.

Exemplary S-Box: Exclusive OR (XOR) Operation Performed on Input of HWBF

Figures 1, 2:
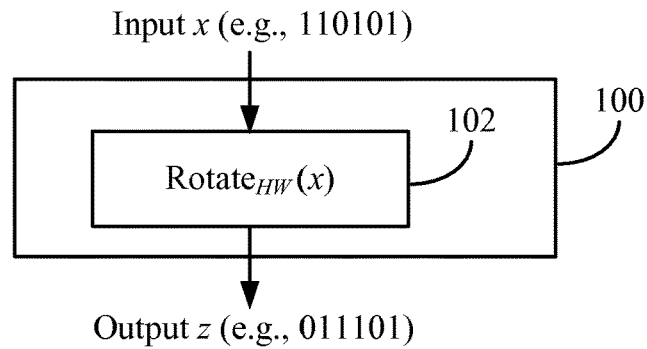
FIG. 1 illustrates a schematic block diagram of an n-bit to n-bit Hamming Weighted Bit Function (HWBF) based substitution box (S-box) found in the prior art.
FIG. 2 illustrates a table depicting the relationship between the HWBF based S-box output z and the HWBF W(x).
Figure 3:
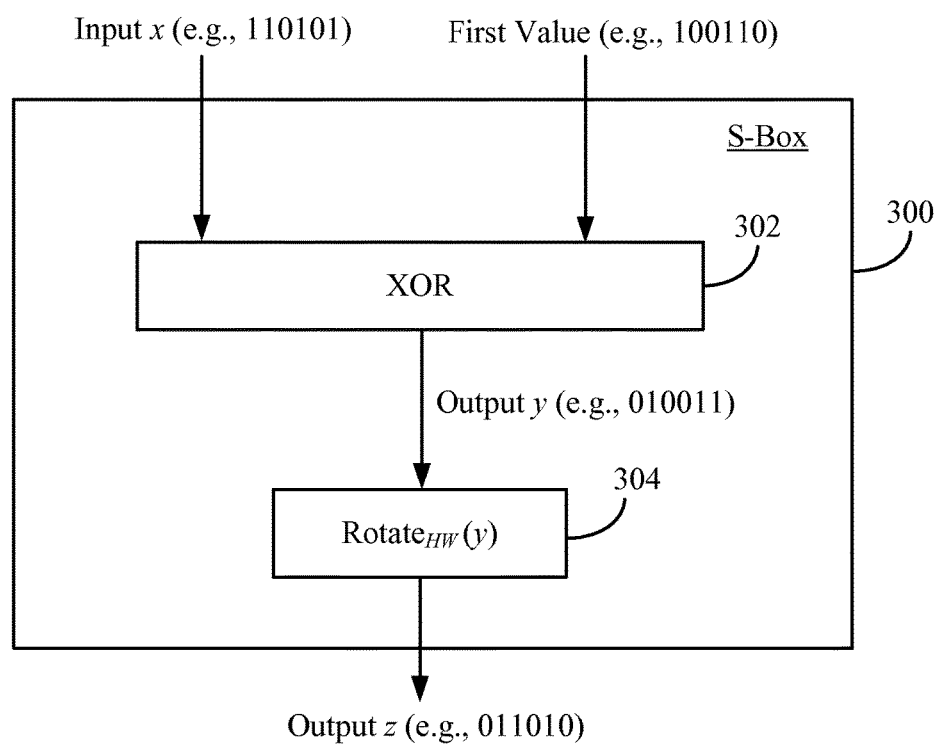
FIG. 3 illustrates a first exemplary schematic block diagram of an S-box.

FIG. 3 illustrates a schematic block diagram of an S-box 300 according to one aspect of the disclosure. A bitwise exclusive OR (XOR) function 302 receives an input value x (e.g., 110101) and a first value (e.g., 100110) as inputs. In the illustrated example, the first value is a constant value that has a non-zero Hamming Weight. The bitwise XOR function 302 generates a first intermediate output y (e.g., 010011) that is input into a rotate function 304. In this example, the rotate function 304 performs a bitwise rotation left on the first intermediate output y by the Hamming Weight of the output y (e.g., rotate left by 3). The resulting output z (e.g., 011010) of the rotate function 304 represents n parallel HWBF outputs where n is the bit-length of the input value x. Notably, the output z does not necessarily have the same Hamming Weight as the input value x, and thus the output z of the S-box 300 is more secure against cryptanalysis than prior art methods. The output z of the S-box 300 may have the same number of bits as the input x. According to one aspect, the rotate function 304 may perform a bitwise rotation right instead and the process will still be equivalent in terms of cryptographic security.

The XOR function 302 may be an XOR circuit that serves as one example of a means for performing a bitwise exclusive OR operation on the input value and the first value to generate a first intermediate value. The rotate function 304 may be executed by a $Rotate_{HM}$ circuit that serves as one example of a: means for performing a bitwise rotation operation on the first intermediate value by a number of bits equal to the Hamming Weight of the first intermediate value to generate the S-box output value; and means for generating an output S-box value.

Exemplary S-Box: XOR Operation Performed on Output of HWBF

Figure 4:
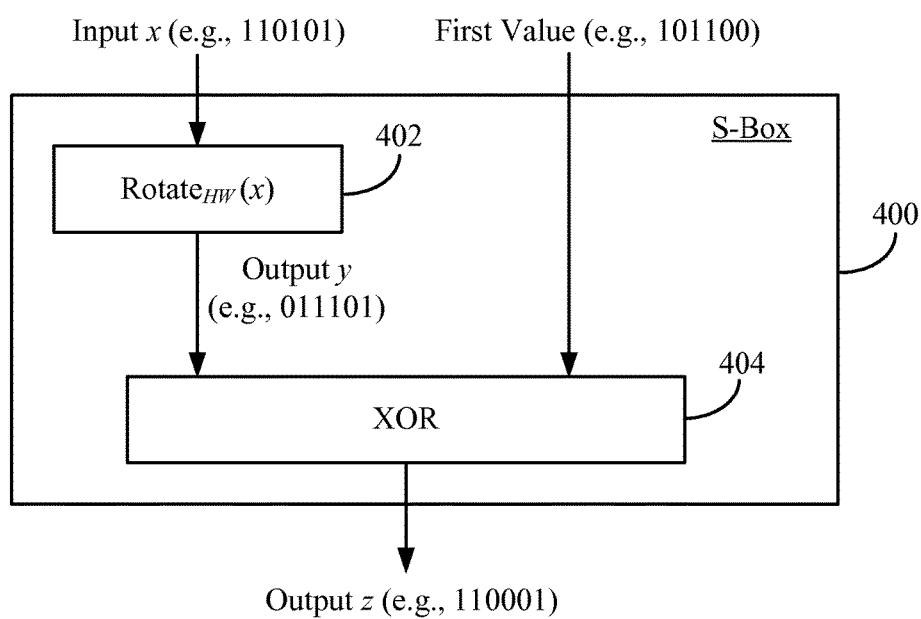
FIG. 4 illustrates a second exemplary schematic block diagram of an S-box.

FIG. 4 illustrates a schematic block diagram of an S-box 400 according to one aspect of the disclosure. A rotate function 402 receives an input value x (e.g., 110101) as an input. In this example, the rotate function 402 performs a bitwise rotation left on the input value x by the Hamming Weight of the input x (e.g., rotate left by 4) to generate a first intermediate output y (e.g., 011101). The resulting intermediate output y of the rotate function 402 represents n parallel HWBF outputs where n is the bit-length of the input value x. Next, a bitwise XOR function 404 receives intermediate output y and a first value (e.g., 101100) as inputs. In the illustrated example, the first value is a constant value that has a non-zero Hamming Weight. The XOR function 404 generates an output z (e.g., 110001) that does not necessarily have the same Hamming Weight as the input value x. Thus, the output z of the S-box 400 is more secure against cryptanalysis than prior art methods. The output z of the S-box 400 may have the same number of bits as the input x. According to one aspect, the rotate function 402 may perform a bitwise rotation right instead and the process will still be equivalent in terms of cryptographic security.

The rotate function 402 may be executed by a Rotate circuit that serves as one example of a means for performing a bitwise rotation operation on the input value by a number of bits equal to the Hamming Weight of the input value to generate the first intermediate value. The XOR function 404 may be executed by an XOR circuit that serves as one example of a: means for performing a bitwise XOR operation on the first intermediate value and the first value to generate the S-box output value; and means for generating an output S-box value.

Exemplary S-Box: XOR Operation Performed at Input and Output of HWBF

Figure 5:
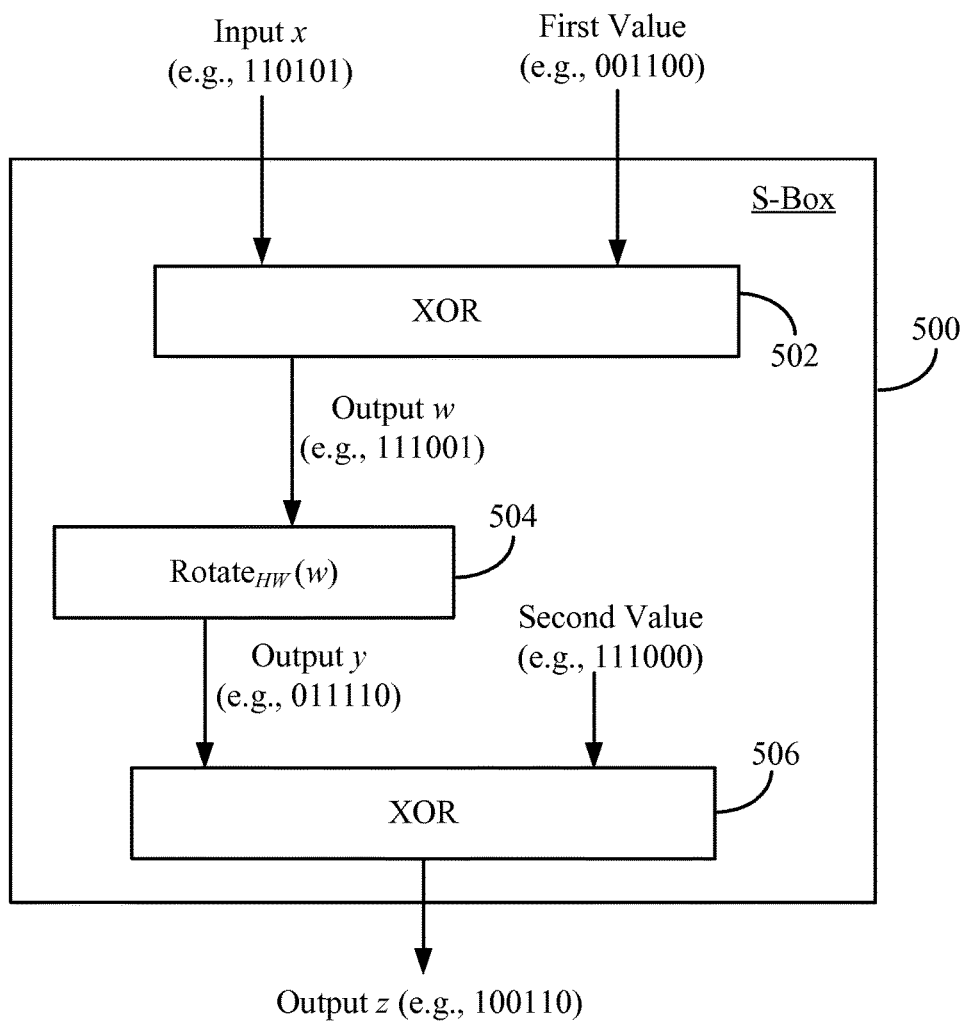
FIG. 5 illustrates a third exemplary schematic block diagram of an S-box.

FIG. 5 illustrates a schematic block diagram of an S-box 500 according to one aspect of the disclosure. A bitwise XOR function 502 receives an input value x (e.g., 110101) and a first value (e.g., 001100) as inputs. In the illustrated example, the first value is a constant value that has a non-zero Hamming Weight. The bitwise XOR function 502 generates a first intermediate output w (e.g., 111001) that is input into a rotate function 504. In this example, the rotate function 504 performs a bitwise rotation left on the first intermediate output w by the Hamming Weight of the output w (e.g., rotate left by 4). The resulting second intermediate output y (e.g., 011110) of the rotate function 504 represents n parallel HWBF outputs where n is the bit-length of the intermediate value y. Then, another bitwise XOR function 506 receives the second intermediate output y and a second value (e.g., 111000) as inputs. In the illustrated example, the second value is a constant value that has a non-zero Hamming Weight. The XOR function 506 generates an output z (e.g., 100110) that does not necessarily have the same Hamming Weight as the input value x. Thus, the output z of the S-box 500 is more secure against cryptanalysis than prior art methods. The output z of the S-box 500 may have the same number of bits as the input x. According to one aspect, the rotate function 504 may perform a bitwise rotation right instead and the process will still be cryptographically equivalent.

The XOR function 502 may be executed by an XOR circuit that serves as one example of a means for performing a bitwise XOR operation on the input value and the first value to generate the first intermediate value. The rotation function 504 may be executed by a Rotate circuit that serves as one example of a means for performing a bitwise rotation operation on the first intermediate value by a number of bits equal to the Hamming Weight of the first intermediate value to generate a second intermediate value. The XOR function 506 may be executed by an XOR circuit that serves as one example of a: performing a bitwise XOR operation on the second intermediate value and the second value to generate the S-box output value; and means for generating an output S-box value.

In the examples described above with respect to FIGS. 3, 4, and 5, the rotate functions perform a bitwise rotation left equal to the Hamming Weight of its input. However, in other aspects the rotate functions may perform a bitwise rotation right equal to the Hamming Weight of its input. In such a case, the most significant bit of the value outputted by the rotate function (instead of the least significant bit) represents the output of an alternative HWBF W'(x). The alternative HWBF W'(x) may have an input x that is an n-bit input where $x_i$ is the i-th least significant bit of x ($1 <= i <= n$). The function W'(x) is thus defined as:

W'(x)=0, if x=0,
W'(x)=$x_k$ where k is the Hamming Weight of x, otherwise.

As an example, if the rotate function 504 rotated the first intermediate value w 111001 to the right instead of to the left, then the second intermediate value y would equal 100111 instead of 011110. After the XOR operation 506 with the second value 111000 the output z of the S-box 500 would be 011111.

According to one aspect, the first and second values input into the XOR functions 302, 404, 502, 506 may be constants as described above. However, in other aspects, the first and second values need not be constants at all. In one aspect, the first and second values may be variable such that their values change in time, at start-up, and/or after a certain number of iterations (i.e., output values generated) of the S-boxes 300, 400, 500. As one example, the first and second values may be variable in that they are derived from a cryptographic key using a function that changes or the key itself changes. Such a scheme may make the output of the S-boxes 300, 400, 500 more robust to cryptographic attacks. According to one aspect, the first and/or second values provided are configured to generate S-box output values having a different Hamming Weight than the input value with a probability equal to or greater than 50%.

Exemplary Types of First and Second Values

Figure 6:
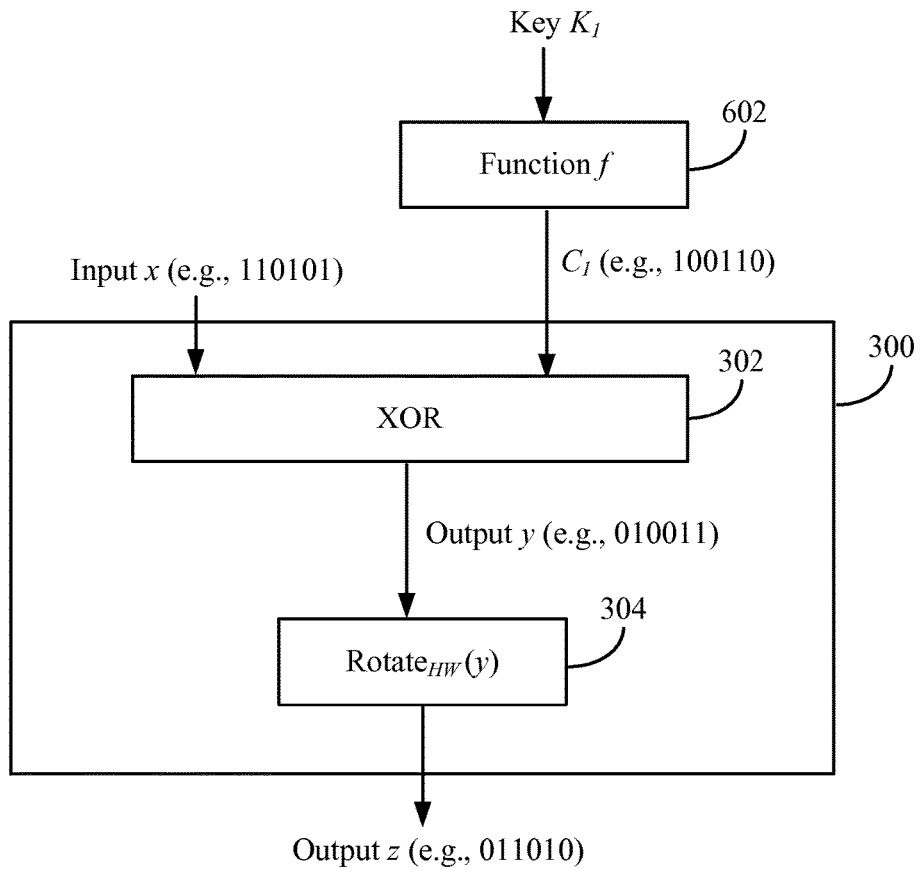
FIG. 6 illustrates an example where a cryptographic function f derives a variable value $C_1$ from a cryptographic key/identifier $K_1$.

FIG. 6 illustrates one such example where the cryptographic function $f$ 602 derives the variable value $C_1$ from a cryptographic key/identifier $K_1$. The cryptographic function $f$ 602 may be, among other things, a hash function. The variable value $C_1$ is then used in the same way described above with reference to FIG. 3 as the first value input into the XOR function 302 to generate an S-box 300 output z. Any of the other S-boxes 400, 500 may be modified in the same way so that the first and/or second values used therein are derived from keys/identifiers using cryptographic functions, such as cryptographic function $f$ 602 and key/identifier $K_1$.

Figure 7:
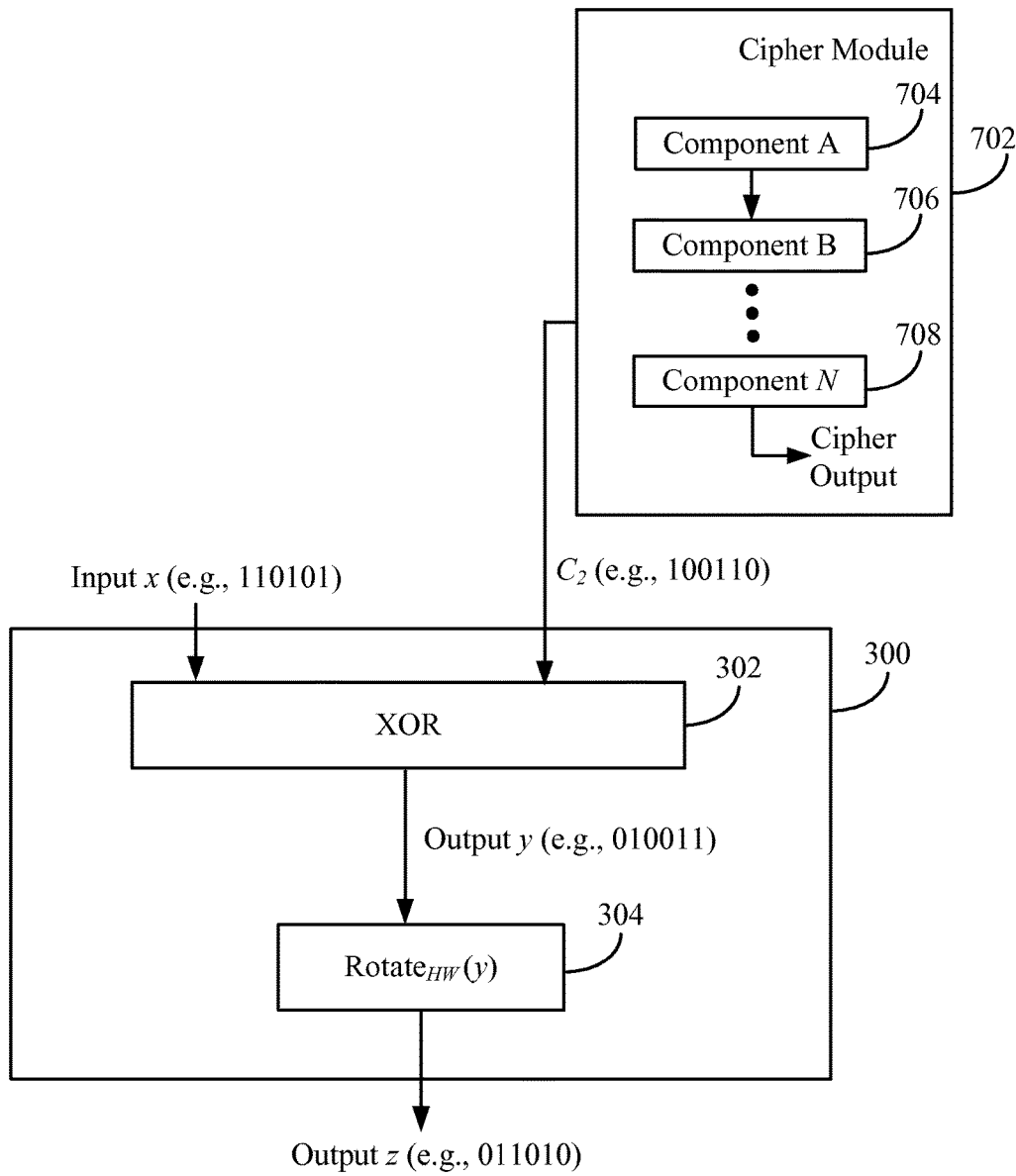
FIG. 7 illustrates an example where a variable value $C_2$ is derived/received from a stage of a cipher module.

According to another aspect where the first and second values are variable, the first and second values may be derived from other operations of a cipher that take place proximate to the S-box. FIG. 7 illustrates one such example where the variable value $C_2$ is derived/received from a stage of a cipher module 702. The cipher module 702 may include a plurality of N integer components 704, 706, 708, and the variable value $C_2$ may be derived from an output or input to any one of those components 704, 706, 708. The components 704, 706, 708 may be, among other things, shift registers, adders, multipliers, processing circuits/blocks, etc.

In one aspect, the S-boxes 300, 400, 500 may be part of the cipher module 702, but in other aspects the S-boxes 300, 400, 500 may be independent to the cipher module 702. According to one example, the cipher block 702 may be a stream cipher.

The variable value $C_2$ is then used in the same way described above with reference to FIG. 3 as a first value input into the XOR function 302 to generate an S-box 300 output z. Any of the other S-boxes 400, 500 may be modified in the same way so that the first and/or second values used therein are derived from one or more stages of a cipher module as shown in FIG. 7.

According to one aspect, the variable inputs $C_1$ and $C_2$ (i.e., first and second values) may be provided such that they have a probability equal to or greater than one of 50%, 60%, 70%, 80%, 90%, 95%, or 99% of having a non-zero Hamming Weight. According to another aspect, the variable inputs $C_1$ and $C_2$ may be provided such that they have a probability equal to or greater than $100*(1-2^{-n})$ percent of having a non-zero Hamming Weight, where n is the number of bits of the variable inputs $C_1$ and $C_2$.

Exemplary S-Box Featuring Additional NLTF Stages

Figure 8:
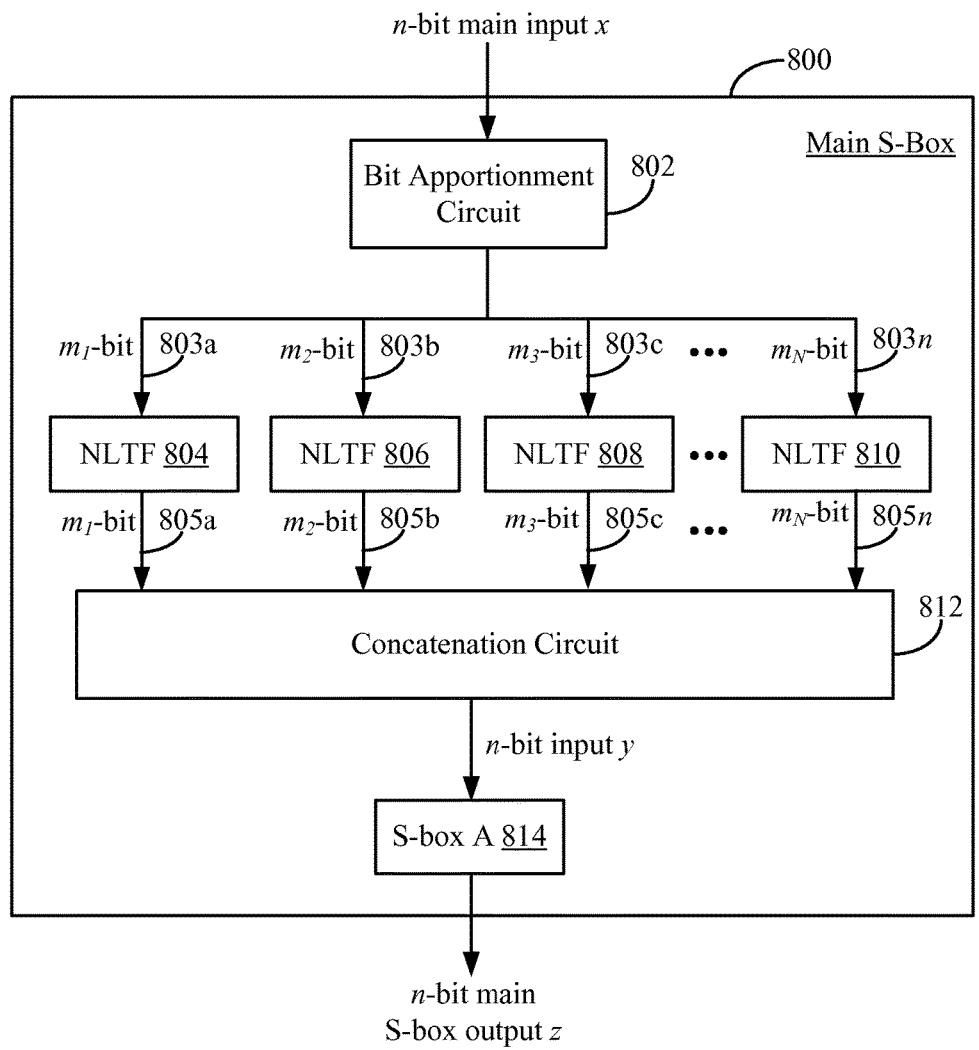
FIG. 8 illustrates a fourth exemplary schematic block diagram of an S-box.

FIG. 8 illustrates a schematic block diagram of an S-box 800 according to another aspect of the disclosure. The S-box 800 (e.g., "main S-box") comprises a bit apportionment circuit 802, a plurality N of non-linear transformation functions (NLTF) sub-circuits 804, 806, 808, 810 (where N is an integer equal to or greater than two (2)), a concatenation circuit 812, and an S-box A sub-circuit 814. The non NLTF sub-circuits 804, 806, 808, 810 may be standard non-linear transformation table-based s-boxes. S-box sub-circuit A 814 is any one of the S-boxes 300, 400, 500 shown and described in FIGS. 3-7.

The main S-box 800 receives an n-bit main input x and generates an n-bit main S-box output z that improves cryptographic security. The bit apportionment circuit 802 breaks up the n-bit main input x into a plurality of smaller $m_1, m_2, m_3, \ldots m_N$ bit NLTF input values 803a, 803b, 803c, ... 803n (i.e., $m_1, m_2, m_3$, and $m_N$ is less than n). The non NLTF sub-circuits 804, 806, 808, 810 may use lookup tables to transform the NLTF input values 803a, 803b, 803c, ... 803n into NLTF output values 805a, 805b, 805c, ... 805n according to a non-linear operation. The NLTF input values 803a, 803b, 803c, ... 803n may have the same number of bits as their corresponding NLTF output values 805a, 805b, 805c, ... 805n. The NLTF output values 805a, 805b, 805c, ... 805n are then concatenated together by the concatenation circuit 812 to generate the n-bit input value y. Identical to the operations/steps described above with respect to FIGS. 3-7, S-box A 804 receives the n-bit input value y along with a first and/or a second value (see e.g., FIGS. 3-7) and performs one or more XOR and Hamming Weight rotation operations (see e.g., FIGS. 3-7) to generate the main n-bit S-box output value z. These output values may have the same bit length (i.e., $m_1, m_2, m_3$, and $m_N$) as the input values received by the S-box sub-circuits 804, 806, 808, 810.

According to one aspect, the bit apportionment circuit 802 serves as one example of a means for apportioning bits of the main input value to obtain a plurality of non-linear transformation function (NLTF) input values, wherein each NLTF input value has a number of bits that is less than a number of bits of the main input value. The bit apportionment circuit 802 may further serve as an example of a means for providing each of the NLTF input values to an NLTF that executes a non-linear operation to generate a plurality of NLTF output values that each correspond to the NLTF input value provided to the NLTF. The concatenation circuit 812 serves as one example of a means for concatenating the plurality of NLTF output values to obtain the input value.

Operation of the main S-box 800 will now be described according to one non-limiting example. The main S-box 800 may receive a 32-bit main input x having bits $b_0$, $b_1$, $b_2$, ... $b_{31}$ that the bit apportionment circuit 802 breaks up into four (4) 8-bit inputs 803a, 803b, 803c, ... 803n to the NLTF sub-circuits 804, 806, 808, 810. The four (4) 8-bit inputs 803a, 803b, 803c, ... 803n may thus be represented by bits: $b_0$, $b_1$, $b_2$, ... $b_7$; $b_8$, $b_9$, $b_{10}$, ... $b_{15}$; $b_{16}$, $b_{17}$, $b_{18}$, ... $b_{23}$; and $b_{24}$, $b_{25}$, $b_{26}$, ... $b_{31}$. Each NLTF sub-circuit 804, 806, 808, 810 receives its corresponding input and may generate an equal number of bits (e.g., 8-bit) outputs 805a, 805b, 805c, ... 805n. The concatenation circuit 812 then concatenates these output values 805a, 805b, 805c, ... 805n to generate the 32-bit S-box A 814 input value y. According to one aspect, the values $m_1$, $m_2$, $m_3$, and $m_N$ are equal to one another such that an equal number of bits from the main input x is sent to each NLTF sub-circuit 804, 806, 808, 810. According to another aspect, the values $m_1$, $m_2$, $m_3$, and $m_N$ are not equal to one another but are less than the value n number of bits.

According to one example, S-box A 814 is the S-box 300 shown in FIG. 3. As such, similar to the process depicted in FIG. 3, S-box A 814 performs an XOR operation on the input value y and a 32-bit first value to generate an intermediate value. Next, S-box A 814 rotates (left or right) the intermediate value by the Hamming Weight of the intermediate value. The resulting rotated 32-bit value is then output from S-box A 814 as a 32-bit main S-box output value z. The 32-bit first value may be provided by circuitry (not shown in FIG. 8) and may be a constant (as shown in FIG. 3) or variable (as shown in FIGS. 6 and 7).

Exemplary Method for Generating Cryptographic Values

Figure 9:
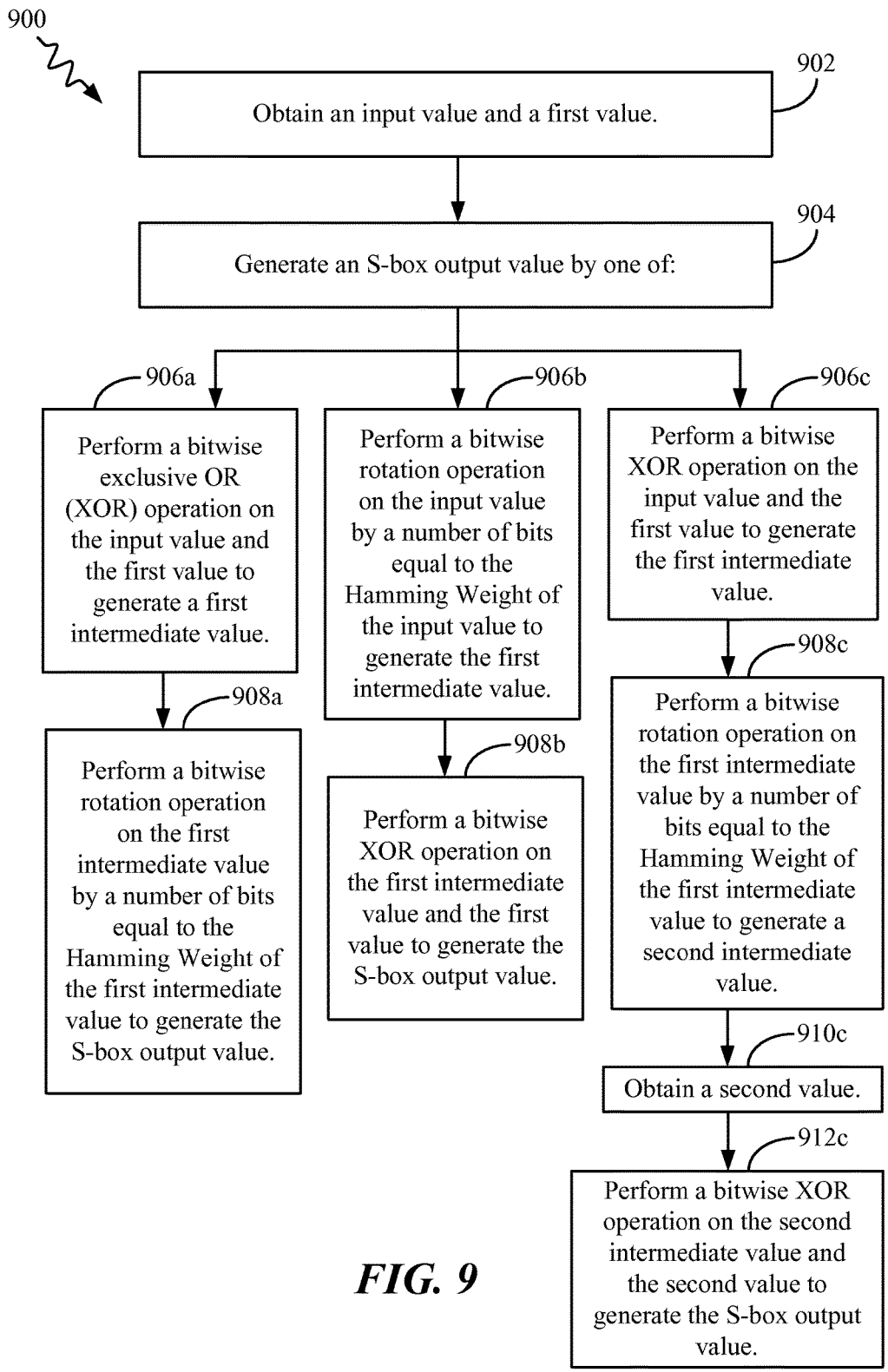
FIG. 9 illustrates a flowchart of a method for generating cryptographic values associated with an S-box.

FIG. 9 illustrates a flowchart 900 of a method for generating cryptographic values associated with a substitution box (S-box). The method comprises obtaining an input value and a first value 902, and generating an S-box output value by one of 904: (A) performing a bitwise exclusive OR (XOR) operation on the input value and the first value to generate a first intermediate value 906a, and performing a bitwise rotation operation on the first intermediate value by a number of bits equal to the Hamming Weight of the first intermediate value to generate the S-box output value 908a; or (B) performing a bitwise rotation operation on the input value by a number of bits equal to the Hamming Weight of the input value to generate the first intermediate value 906b, and performing a bitwise XOR operation on the first intermediate value and the first value to generate the S-box output value 908b; or (C) performing a bitwise XOR operation on the input value and the first value to generate the first intermediate value 906c, performing a bitwise rotation operation on the first intermediate value by a number of bits equal to the Hamming Weight of the first intermediate value to generate a second intermediate value 908c, obtaining a second value 910c, and performing a bitwise XOR operation on the second intermediate value and the second value to generate the S-box output value 912c.

Exemplary Electronic Device Incorporating S-Box(es)

Figure 10:
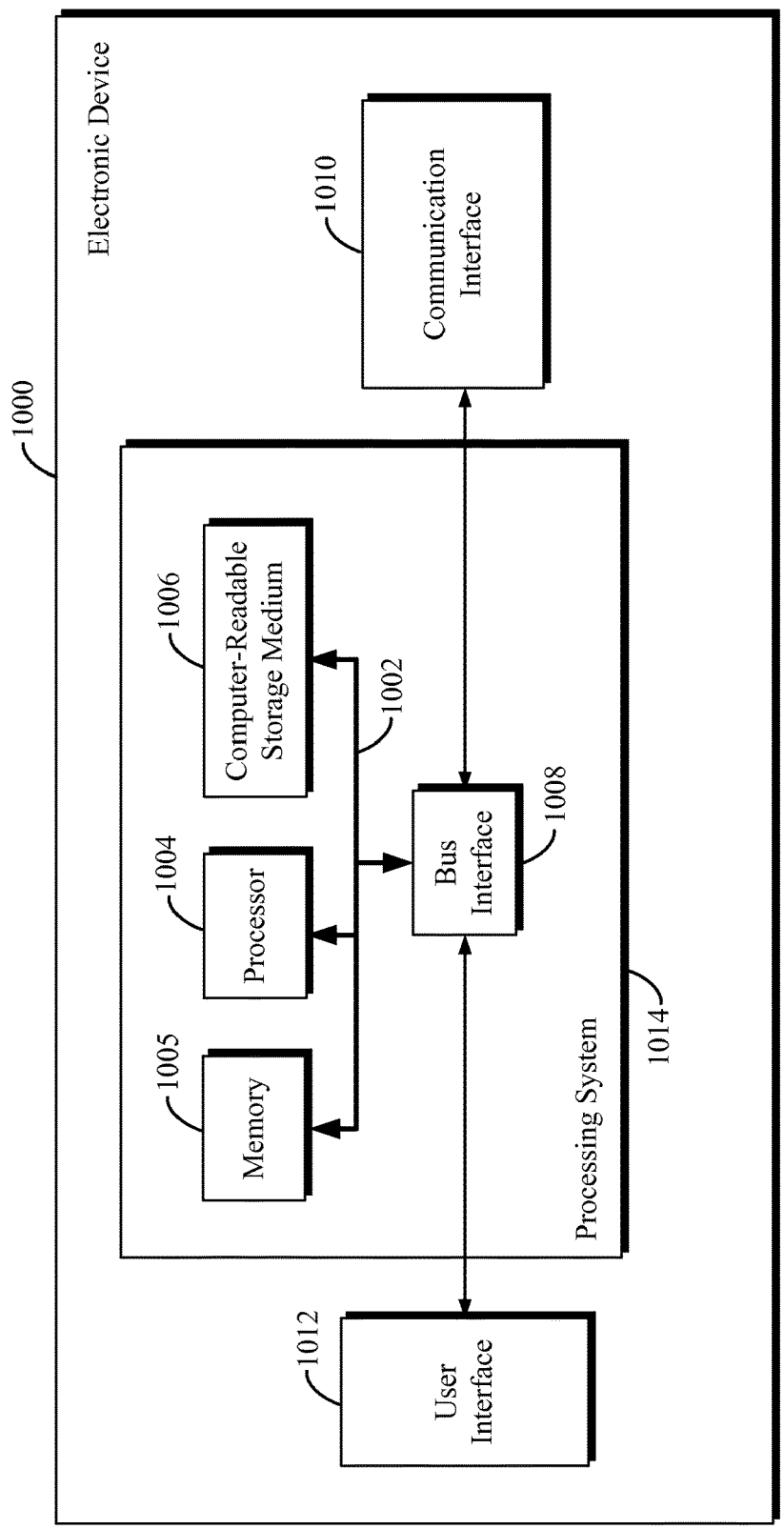
FIG. 10 illustrates a schematic block diagram of a hardware implementation for an electronic device incorporating the S-boxes described herein.

FIG. 10 illustrates a schematic block diagram of a hardware implementation for an electronic device 1000 incorporating any one of the S-boxes 300, 400, 500, 800 described herein according to one aspect. The electronic device 1000 may be a mobile phone, smartphone, tablet, portable computer, and or any other electronic device having circuitry. The electronic device 1000 may include a communication interface 1010, a user interface 1012, and a processing system 1014. The processing system 1014 may include a processing circuit (e.g., processor) 1004, a memory circuit (e.g., memory) 1005, a computer-readable storage medium 1006, a bus interface 1008, and a bus 1002. The processing system 1014 and/or the processing circuit 1004 may be configured to perform any of the steps, functions, and/or processes described with respect to the S-boxes 300, 400, 500, 800 and other circuits and/or modules 602, 702 described above with respect to FIGS. 3, 4, 5, 6, 7, 8, and/or 9.

The processing circuit 1004 may be one or more processors (e.g., first processor, etc.) that are adapted to process data for the electronic device 1000. For example, the processing circuit 1004 may be a specialized processor, such as an application specific integrated circuit (ASIC) that serves as a means for carrying out any one of the steps described in FIG. 9. That is, the processing circuit 1004 may be configured to obtain an input value and a first value, and generate an S-box output value by one of: (A) performing a bitwise exclusive OR (XOR) operation on the input value and the first value to generate a first intermediate value, and performing a bitwise rotation operation on the first intermediate value by a number of bits equal to the Hamming Weight of the first intermediate value to generate the S-box output value; (B) performing a bitwise rotation operation on the input value by a number of bits equal to the Hamming Weight of the input value to generate the first intermediate value, and performing a bitwise XOR operation on the first intermediate value and the first value to generate the S-box output value; or (C) performing a bitwise XOR operation on the input value and the first value to generate the first intermediate value, performing a bitwise rotation operation on the first intermediate value by a number of bits equal to the Hamming Weight of the first intermediate value to generate a second intermediate value, obtaining a second value, and performing a bitwise XOR operation on the second intermediate value and the second value to generate the S-box output value.

Examples of processing circuits 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processing circuit 1004 is also responsible for managing the bus 1002, and executing software stored on the computer-readable storage medium 1006 and/or memory 1005. The software, when executed by the processing circuit 1004, causes the processing system 1014 to perform the various functions, steps, and/or processes described above with respect to the S-boxes 300, 400, 500, 800. The computer-readable storage medium 1006 may be used for storing data that is manipulated by the processing circuit 1004 when executing software.

The memory circuit 1005 may be non-volatile memory, such as but not limited to FLASH memory, magnetic or optical hard disk drives, etc. In some aspects, the memory storing the sector information and/or overhead messages (including configuration sequence number) may be volatile memory, such as DRAM (e.g., DDR SDRAM), SRAM, etc. that may be continuously powered so as to store the information indefinitely.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1006. The computer-readable storage medium 1006 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium may also include, by way of example, a carrier wave, a transmission line, and any other suitable medium for transmitting software and/or instructions that may be accessed and read by a computer. The computer-readable storage medium 1006 may reside in the processing system 1014, external to the processing system 1014, or distributed across multiple entities including the processing system 1014. The computer-readable storage medium 1006 may be embodied in a computer program product.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 links together various circuits including one or more processors (represented generally by the processor 1004), a memory 1005, and computer-readable media (represented generally by the computer-readable storage medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and the communication interface 1010 (if present). The communication interface 1010 provides a means for communicating with other apparatus over a transmission medium. Depending upon the nature of the apparatus, a user interface 1012 (e.g., keypad, display, speaker, microphone, touchscreen display, etc.) may also be provided for the electronic device 1000.

Figure 11:
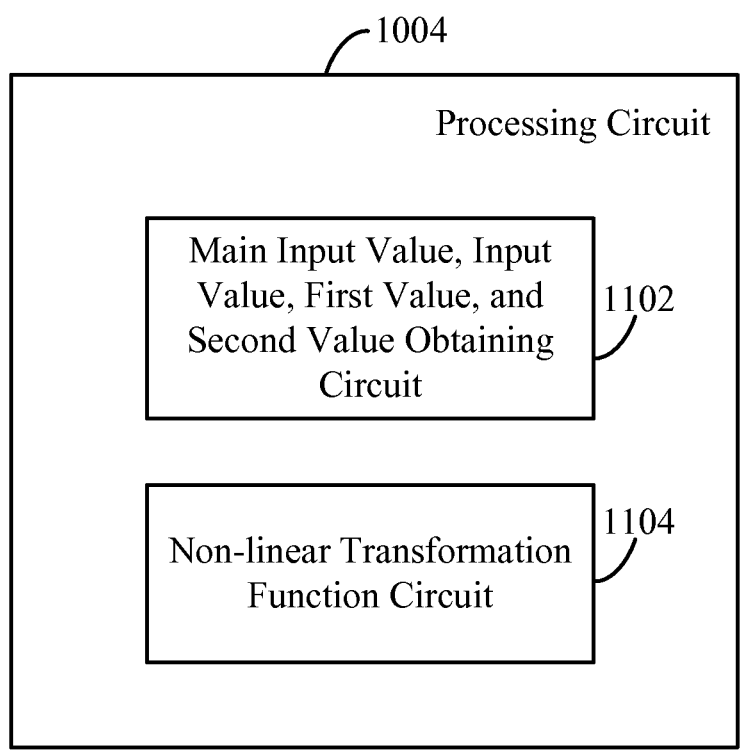
FIG. 11 illustrates a schematic block diagram of a processor of the electronic device.

FIG. 11 illustrates a schematic block diagram of the processor 1004 according to one aspect of the disclosure. The processor 1004 comprises, among other things, a main input value, an input value, a first value, and/or a second value obtaining circuit 1102. The obtaining circuit 1102 serves as one example of a means for obtaining a main input value, an input value, a first value, and/or a second value. The processor 1004 further comprises a non-linear transformation function circuit 1104, which is configured to execute an NLTF as described above with respect to FIG. 8.

One or more of the components, steps, features, and/or functions illustrated in FIGS. 3, 4, 5, 6, 7, 8, 9, 10, and/or 11 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 3, 4, 5, 6, 7, 8, 10, and/or 11 may be configured to perform one or more of the methods, features, or steps described in FIG. 9. The algorithms described herein may also be efficiently implemented in software and/or embedded in hardware.

Moreover, in one aspect of the disclosure, the processing circuit 1004 illustrated in FIGS. 10 and/or 11 may be a specialized processor (e.g., an application specific integrated circuit (e.g., ASIC)) that is specifically designed and/or hard-wired to perform the algorithms, methods, and/or steps described in FIG. 9. Thus, such a specialized processor (e.g., ASIC) may be one example of a means for executing the algorithms, methods, and/or steps described in FIG. 9. The computer-readable storage medium 1006 may also store processor 1004 readable instructions that when executed by a specialized processor (e.g., ASIC) causes the specialized processor to perform the algorithms, methods, and/or steps described in FIG. 9.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method for generating cryptographic values for data in a processing system utilizing a substitution box (S-box) comprising an exclusive OR (XOR) circuit and rotate circuit, the method comprising:
   obtaining an input value derived from a main input value and a first value that is not derived from the main input value for the data in the processing system; and
   generating, via the S-box, an S-box output value by one of:
   (A) performing a bitwise XOR operation via the XOR circuit on the input value and the first value to generate a first intermediate value, and
      performing a bitwise rotation operation via the rotate circuit on the first intermediate value by a number of bits equal to the Hamming Weight of the first intermediate value to generate the S-box output value;
   (B) performing a bitwise rotation operation via the rotate circuit on the input value by a number of bits equal to the Hamming Weight of the input value to generate the first intermediate value, and
      performing a bitwise XOR operation via the XOR circuit on the first intermediate value and the first value to generate the S-box output value; or
   (C) performing a bitwise XOR operation via the XOR circuit on the input value and the first value to generate the first intermediate value,
      performing a bitwise rotation operation via the rotate circuit on the first intermediate value by a number of bits equal to the Hamming Weight of the first intermediate value to generate a second intermediate value,
      obtaining a second value, and
      performing a bitwise XOR operation via the XOR circuit on the second intermediate value and the second value to generate the S-box output value,
   generating cryptographic values using the S-box output value for securing the data in the processing system.

2. The method of claim 1, wherein at least one of the first and/or second values provided are configured to generate the S-box output value having a different Hamming Weight than the input value with a probability equal to or greater than 50%.

3. The method of claim 1, wherein at least one of the first value and/or the second value is a constant having a non-zero Hamming Weight.

4. The method of claim 1, wherein at least one of the first and/or second values provided are variable and have a probability equal to or greater than $100*(1-2^{-n})$ percent of having a non-zero Hamming Weight, where n is a number of bits of the first and/or second values.

5. The method of claim 1, wherein at least one of the first value and/or the second value is derived from at least one of a cryptographic function and/or cryptographic key.

6. The method of claim 1, wherein at least one of the first value and/or the second value is derived from a component stage of a cipher module.

7. The method of claim 6, wherein the cipher module is a stream cipher.

8. The method of claim 1, wherein the method is executed in a memory circuit.

9. The method of claim 1, wherein the input value and the S-box output value have the same number of bits.

10. The method of claim 1, further comprising:
    obtaining the main input value; apportioning bits of the main input value to obtain a plurality of non-linear transformation function (NLTF) input values, wherein each NLTF input value has a number of bits that is less than a number of bits of the main input value;
    providing each of the NLTF input values to an NLTF that executes a non-linear operation to generate a plurality of NLTF output values that each correspond to the NLTF input value provided to the NLTF; and
    concatenating the plurality of NLTF output values to obtain the input value.

11. The method of claim 10, wherein the main input value is apportioned so that each of the plurality of NLTF input values have the same number of bits.

12. An electronic device comprising:
    an interface to communicate data; and
    a processing circuit comprising a substitution box (S-box) comprising an exclusive OR (XOR) circuit and rotate circuit, the processing circuit configured to obtain an input value derived from a main input value and a first value that is not derived from the main input value, wherein the processing circuit is configured to generate an S-box output value by one of:

(A) performing a bitwise exclusive OR (XOR) operation via the XOR circuit on the input value and the first value to generate a first intermediate value, and performing a bitwise rotation operation via the rotate circuit on the first intermediate value by a number of bits equal to the Hamming Weight of the first intermediate value to generate the S-box output value;

(B) performing a bitwise rotation operation via the rotate circuit on the input value by a number of bits equal to the Hamming Weight of the input value to generate the first intermediate value, and performing a bitwise XOR operation via the XOR circuit on the first intermediate value and the first value to generate the S-box output value; or (C) performing a bitwise XOR operation via the XOR circuit on the input value and the first value to generate the first intermediate value, performing a bitwise rotation operation via the rotate circuit on the first intermediate value by a number of bits equal to the Hamming Weight of the first intermediate value to generate a second intermediate value, obtaining a second value, and performing a bitwise XOR operation on the second intermediate value and the second value to generate the S-box output value, and wherein the processing circuit is configured to generate cryptographic values using the S-box output value for securing the data communicated via the interface.

13. The electronic device of claim 12, wherein at least one of the first and/or second values provided are configured to generate the S-box output value having a different Hamming Weight than the input value with a probability equal to or greater than 50%.

14. The electronic device of claim 12, wherein at least one of the first value and/or the second value is a constant having a non-zero Hamming Weight.

15. The electronic device of claim 12, wherein at least one of the first and/or second values provided are variable and have a probability equal to or greater than $100*(1-2^{-n})$ percent of having a non-zero Hamming Weight, where n is a number of bits of the first and/or second values.

16. The electronic device of claim 12, wherein at least one of the first value and/or the second value is derived from at least one of a cryptographic function and/or cryptographic key.

17. The electronic device of claim 12, wherein at least one of the first value and/or the second value is derived from a component stage of a cipher module.

18. The electronic device of claim 12, wherein the processing circuit is further configured to:

obtain the main input value;

apportion bits of the main input value to obtain a plurality of non-linear transformation function (NLTF) input values, wherein each NLTF input value has a number of bits that is less than a number of bits of the main input value;

provide each of the NLTF input values to an NLTF that executes a non-linear operation to generate a plurality of NLTF output values that each correspond to the NLTF input value provided to the NLTF; and concatenate the plurality of NLTF output values to obtain the input value.

19. An electronic device comprising:

an interface to communicate data;

means comprising a substitution box (S-box) comprising an exclusive OR (XOR) circuit and rotate circuit, for obtaining an input value derived from a main input value and a first value that is not derived from the main input value; and means for generating an S-Box output value by one of:

(A) means for performing a bitwise exclusive OR (XOR) operation via the XOR circuit on the input value and the first value to generate a first intermediate value, and means for performing a bitwise rotation operation via the rotate circuit on the first intermediate value by a number of bits equal to the Hamming Weight of the first intermediate value to generate the S-box output value;

(B) means for performing a bitwise rotation operation via the rotate circuit on the input value by a number of bits equal to the Hamming Weight of the input value to generate the first intermediate value, and means for performing a bitwise XOR operation via the XOR circuit on the first intermediate value and the first value to generate the S-box output value; or (C) means for performing a bitwise XOR operation via the XOR circuit on the input value and the first value to generate the first intermediate value, means for performing a bitwise rotation operation via the rotate circuit on the first intermediate value by a number of bits equal to the Hamming Weight of the first intermediate value to generate a second intermediate value, means for obtaining a second value, and means for performing a bitwise XOR operation via the XOR circuit on the second intermediate value and the second value to generate the S-box output value, wherein the electronic device is configured to generate cryptographic values using the S-box output value to secure the data communicated via the interface.

20. The electronic device of claim 19, wherein at least one of the first and/or second values provided are configured to generate the S-box output value having a different Hamming Weight than the input value with a probability equal to or greater than 50%.

21. The electronic device of claim 19, wherein at least one of the first value and/or the second value is a constant having a non-zero Hamming Weight.

22. The electronic device of claim 19, wherein at least one of the first value and/or the second value is derived from at least one of a cryptographic function and/or cryptographic key.

23. The electronic device of claim 19, wherein at least one of the first value and/or the second value is derived from a component stage of a cipher module.

24. The electronic device of claim 19, further comprising:

means for obtaining the main input value; means for apportioning bits of the main input value to obtain a plurality of non-linear transformation function (NLTF) input values, wherein each NLTF input value has a number of bits that is less than a number of bits of the main input value;

means for providing each of the NLTF input values to an NLTF that executes a non-linear operation to generate a plurality of NLTF output values that each correspond to the NLTF input value provided to the NLTF; and means for concatenating the plurality of NLTF output values to obtain the input value.

25. A computer-readable non-transitory storage medium having instructions for generating cryptographic values for data in a processing system comprising a substitution box (S-box) comprising an exclusive OR (XOR) circuit and rotate circuit, the processing circuit, the instruction which when executed by at least one processor causes the processor to:

obtain an input value derived from a main input value and a first value that is not derived from the main input value for the data in the processing system; and generate an S-box output value by one of:

(A) performing a bitwise exclusive OR (XOR) operation via the XOR circuit on the input value and the first value to generate a first intermediate value, and performing a bitwise rotation operation via the rotate circuit on the first intermediate value by a number of bits equal to the Hamming Weight of the first intermediate value to generate the S-box output value;

(B) performing a bitwise rotation operation via the rotate circuit on the input value by a number of bits equal to the Hamming Weight of the input value to generate the first intermediate value, and performing a bitwise XOR operation via the XOR circuit on the first intermediate value and the first value to generate the S-box output value; or (C) performing a bitwise XOR operation via the XOR circuit on the input value and the first value to generate the first intermediate value, performing a bitwise rotation operation via the rotate circuit on the first intermediate value by a number of bits equal to the Hamming Weight of the first intermediate value to generate a second intermediate value, obtaining a second value, and performing a bitwise XOR operation via the XOR circuit on the second intermediate value and the second value to generate the S-box output value generate cryptographic values using the S-box output value to secure the data in the processing system.

26. The computer-readable non-transitory storage medium of claim 25, wherein at least one of the first and/or second values provided are configured to generate the S-box output value having a different Hamming Weight than the input value with a probability equal to or greater than 50%.

27. The computer-readable non-transitory storage medium of claim 25, wherein at least one of the first value and/or the second value is a constant having a non-zero Hamming Weight.

28. The computer-readable non-transitory storage medium of claim 25, wherein the instructions which when executed by the processor further cause the processor to:

obtain the main input value; apportion bits of the main input value to obtain a plurality of non-linear transformation function (NLTF) input values, wherein each NLTF input value has a number of bits that is less than a number of bits of the main input value;

provide each of the NLTF input values to an NLTF that executes a non-linear operation to generate a plurality of NLTF output values that each correspond to the NLTF input value provided to the NLTF; and concatenate the plurality of NLTF output values to obtain the input value.

* * * * *